April 21, 1970  YOSHIYUKI SHIMIZU  3,507,558
CAMERA LENS OF A LARGE APERTURE RATIO HAVING LONG BACK FOCUS
Filed Oct. 20, 1966

United States Patent Office 3,507,558
Patented Apr. 21, 1970

3,507,558
CAMERA LENS OF A LARGE APERTURE RATIO
HAVING LONG BACK FOCUS
Yoshiyuki Shimizu, Tokyo, Japan, assignor to Nippon Kogaku K.K., Tokyo, Japan, represented by Hiroshi Shirahama, a corporation of Japan
Filed Oct. 20, 1966, Ser. No. 588,212
Claims priority, application Japan, Oct. 22, 1965, 40/64,423
Int. Cl. G02b 9/08, 9/62, 11/32
U.S. Cl. 350—210                         2 Claims

ABSTRACT OF THE DISCLOSURE

A large aperture ratio objective having a long back focus in which the lens group $B_2$ has a composite positive refractive power and consists of a negative meniscus lens formed by cementing a biconcave lens and a biconvex lens, followed by a positive meniscus lens and a biconvex lens behind the stop, and in front of the stop comprises a cemented meniscus lens of positive refractive power. The front lens group $B_1$ is of negative refractive power. The aperture ratio of the lens is over 1:2 with an angle of field over 60°.

---

Figure 1:
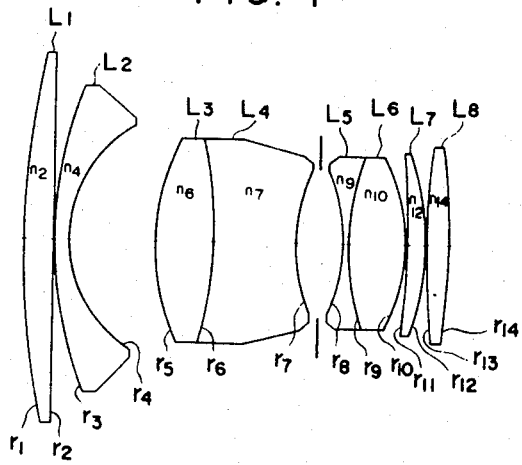

This invention relates to a camera lens of a large aperture ratio having a long back focus.

The wide angle lenses used for a single lens reflex camera containing a pivotable mirror are generally of the so called back telescopic type. These lenses have a small aperture ratio resulting in a darkened view in the finder and a large depth of field. Focusing of the object is done with some difficulty, making a lens of a larger aperture ratio more desirable.

It is an object of the present invention to provide a lens having a large aperture ratio.

In accordance with the present invention, a wide angle lens of large aperture ratio is provided having a long back focus, the aperture ratio thereof being over 1:2, the angle of field thereof being over 60°, and which can be used for a single lens reflex camera.

Figure 2:
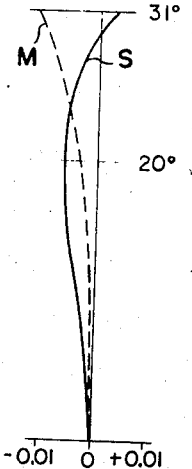
Figure 2:
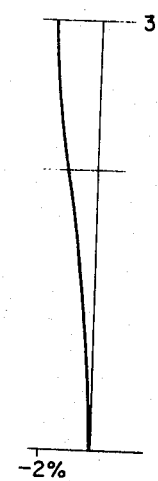

The present invention will now be more apparent from the following description referring to the embodiment shown in the drawing in which:

FIG. 1 is the cross sectional view of the lens system showing an embodiment of the present invention; and FIG. 2 is the aberration curve thereof.

A wide angle lens of the back-telescopic type having a longer back focus when compared with the focal length may be considered by separating the lens into a lens group $B_1$ having the composite negative refractive power and a lens group $B_2$ having the composite positive refractive power at the rear of the group $B_1$. The group $B_1$ has the effect to lengthen the back focus and to increase the angle of field, but in view of aberration, it is apt to give the following drawbacks to the whole lens system;

(1) Coma aberration is disturbed, and in particular it is easy to bring about internal coma.

(2) Astigmatism is caused, and especially the sagittal image is easier to be curved in the direction of excessive correction, i.e., in the positive direction than meridional image, and in the case of the angle of field over 60°, this tendency becomes significant.

(3) It is easy to possess the negative distortion.

The positive lens group $B_2$ corrects the whole or a part of said tendency, and preferably corrects the final image. In accordance with the present invention, the following functions are especially given to $B_2$.

(a) Correction of coma aberration.
(b) Correction of astigmatism.

When the corrections are to be carried out by the lens group $B_1$, it is necessary to enlarge the effective diameter of the respective lenses comprising group $B_1$ which results in a complicated structure in which a large number of lenses are required with the attendant disadvantages of weight and size.

According to the lens structure of the present invention, when viewed from the direction of the projection of light rays, the positive single lens $L_1$ comes first, and then the negative meniscus lens $L_2$ with the convexed surface thereof facing the object is next. The lens group $B_1$ having negative refractive power is composed of these two lenses. The positive lens $L_1$ is required for correction of distortion, and as to the positive meniscus lens with the convexed surface thereof turned to the object space, it is composed by cementing two lenses, i.e., biconvex lens $L_3$ having a higher refractive power and a biconcave lens $L_4$ having a lower refractive power. When the refractive indices of $L_3$ and $L_4$ are set up to be $n_6$ and $n_7$, respectively, they have the relation of $n_6 > n_7$, and at the same time, the cemented surface $r_6$ has a negative value and has the relation of $\infty > |r_6| > 0.5f$. These are aimed to correct the coma aberration of the light rays coming from outside of the main light rays projected at a predetermined angle. When the value of $r_6$ becomes positive, they do not work on the correction of coma aberration, and when the relation becomes $-r_6 < 0.5f$, astigmatism is brought about, and the meridional image is curved in the negative which is difficult to correct.

Next comes the negative meniscus lens with the convex surface thereof turned to the space between the lens $L_4$ and the stop. The negative meniscus lens is obtained by cementing a biconcave lens $L_5$ and biconvex lens $L_6$. When the refractive indices of lenses $L_5$ and $L_6$ are set to be $n_9$ and $n_{10}$, and the radius of curvature of the cemented surface is $r_9$, then the conditions of $n_9 > n_{10}$ and $3f > r_9 > 0.25f$ are to be satisfied. These conditions not only prevent the light rays coming from inside of the main light rays and becoming coma flare but also correct the astigmatism by turning back the curve of sagittal image towards the positive direction to the negative direction. When $r_9$ is larger than $3f$ it does not correct coma aberration. When $r_9$ is smaller than $0.25f$ the sagittal image is excessively curved in the negative direction to deteriorate not only astigmatism but also coma aberration, and correction becomes difficult. The composite focal length up to $r_{10}$ is in the negative, and this is remarkably effective in increasing back focus.

The next two lenses, i.e., a positive meniscus lens $L_7$, the convex surface of which is toward the object and a biconvex lens $L_8$, have the functions of making the virtual image formed by said lenses $L_1$ through $L_6$ into a real image to form an excellent image on the surface of a film. The lenses $L_7$ and $L_8$ work to correct the spherical aberration. Thus, in accordance with the present invention it is possible to produce a highly efficient, small and light weight wide angle camera lens having a large aperture ratio (such as F:2), an angle of field over 60°, and a long back focus, wherein aberration is excellently corrected throughout the image surface. An example of the present invention and Seidel coefficients thereof are given below:

EXAMPLE

[$f=1.0$; $2w=62°$; F:2; B·$f=1.1337$]

| | | | $\nu_d$ |
|---|---|---|---|
| $r_1=+3.2117$ | $d_1=0.10833$ | $n_1=1.0$ | |
| $r_2=\infty$ | $d_2=0.00278$ | $n_2=1.71300$ | 53.9 |
| $r_3=+1.3889$ | $d_3=0.06111$ | $n_3=1.0$ | |
| $r_4=+0.4778$ | $d_4=0.31111$ | $n_4=1.51680$ | 64.2 |
| $r_5=+0.8945$ | $d_5=0.22778$ | $n_5=1.0$ | |
| $r_6=-1.5278$ | $d_6=0.29167$ | $n_6=1.66755$ | 41.9 |
| $r_7=+0.9444$ | $d_7=0.14722$ | $n_7=1.51454$ | 54.62 |
| $r_8=-0.5992$ | $d_8=0.02778$ | $n_8=1.0$ | |
| $r_9=+1.0775$ | $d_9=0.19444$ | $n_9=1.78470$ | 26.1 |
| $r_{10}=-0.7172$ | $d_{10}=0.00278$ | $n_{10}=1.74443$ | 49.4 |
| $r_{11}=-3.0556$ | $d_{11}=0.08333$ | $n_{11}=1.0$ | |
| $r_{12}=-1.0691$ | $d_{12}=0.00278$ | $n_{12}=1.76684$ | 46.2 |
| $r_{13}=+3.6111$ | $d_{13}=0.06944$ | $n_{13}=1.0$ | |
| $r_{14}=-2.1958$ | | $n_{14}=1.74400$ | 44.9 |
| | | $n_{15}=1.0$ | |

| | I | II | III–IV | IV | V |
|---|---|---|---|---|---|
| 1 | 0.007334 | 0.0179086 | 0.0874548 | 0.1733250 | 0.4232080 |
| 2 | 0.0071112 | −0.0375082 | 0.3056748 | 0.1978374 | −1.0434910 |
| 3 | 0.0079256 | 0.0109298 | 0.0301458 | 0.2603874 | 0.3590868 |
| 4 | −4.1299708 | 0.9848172 | −0.4696714 | −0.9479318 | 0.2260402 |
| 5 | 1.8270342 | 0.3143200 | 0.1081502 | 0.5016076 | 0.0862958 |
| 6 | 0.1799666 | −0.1575342 | 0.2757958 | 0.1775524 | −0.1554210 |
| 7 | −0.2755608 | −0.2541436 | −0.4687822 | −0.5941258 | −0.5479492 |
| 8 | −0.8667396 | 0.4853216 | −0.5435012 | −1.0055318 | 0.5630368 |
| 9 | −0.2688630 | −0.1238492 | −0.1141000 | −0.0690544 | −0.0318092 |
| 10 | 0.6274540 | −0.2536652 | 0.2051020 | 0.6975688 | −0.2820110 |
| 11 | 0.0010942 | −0.0044824 | 0.0367250 | −0.1236774 | 0.5066446 |
| 12 | 1.2946352 | −0.4351878 | 0.2925742 | 0.5522526 | −0.1856380 |
| 13 | −0.0006468 | 0.0097138 | −0.2917586 | −0.0277420 | 0.4166180 |
| 14 | 2.0788050 | −0.6138424 | 0.3625182 | 0.3755416 | −0.1108922 |
| Σ | 0.4895778 | −0.0572022 | −0.0936720 | 0.1680096 | 0.2237184 |

With regard to a wide angle camera lens having a large aperture ratio which may be used in a reflex camera, there are a number of problems such as size or form of the lens, coma aberrations and the like. In the present invention, attention was especially centered on the removal of coma aberration, so that sufficient peripheral light can be utilized. It is possible, in accordance with this invention, to produce a wide angle camera lens of a large aperture ratio wherein various aberrations can be excellently corrected so that it is possible to attain a back focus of 1.1337$f$ when the aperture ratio is over F/2 and the angle of field is over 60°, and when the stop is opened, an excellent contrast can be obtained. Also it is possible to reduce the diameter of the lens in the foremost portion to a comparatively small size of about 1.3$f$, thus permitting the diameter of an attachment lens or filter to be made about 1.5$f$.

What is claimed is:
1. A wide angle camera lens having a large aperture ratio and long back focus which consists of as viewed from the direction of the light rays incidence,
  a positive convexo plano lens $L_1$,
  a negative meniscus single lens $L_2$ with the convex surface thereof turned to the object,
  a biconvex lens $L_3$ and a biconcave lens $L_4$ cemented together in this order to form a doublet with the convex surface thereof directed to the object space and with the cemented surface having positive power,
  a stop diaphragm,
  a biconcave lens $L_5$ and a biconvex lens $L_6$ cemented together to form a doublet with the convex surface thereof directed to the image space and with the cemented surface having negative power,
  a positive meniscus lens $L_7$ with the convex surface directed to the image space, and
  a biconvex lens $L_8$.
2. A wide angle camera lens having a large aperture ratio and a long back focus comprising in seriatim a positive lens, a negative meniscus single lens with its convex surface toward the object, a biconvex lens and a biconcave lens cemented together with the convex surface directed toward the object, a stop, a biconcave lens and a biconvex lens cemented together with the convex surface thereof directed toward the image, a positive meniscus convex lens, the lenses having the following relation:
convex lens, the lenses having the following relation

[$f=1.0$; $2w=62°$; F:2; B·$f=1.1337$]

| | | | $\nu_d$ |
|---|---|---|---|
| $r_1=+3.2117$ | $d_1=0.10833$ | $n_1=1.0$ | |
| $r_2=\infty$ | $d_2=0.00278$ | $n_2=1.71300$ | 53.9 |
| $r_3=+1.3889$ | $d_3=0.06111$ | $n_3=1.0$ | |
| $r_4=+0.4778$ | $d_4=0.31111$ | $n_4=1.51680$ | 64.2 |
| $r_5=+0.8945$ | $d_5=0.22778$ | $n_5=1.0$ | |
| $r_6=-1.5278$ | $d_6=0.29167$ | $n_6=1.66755$ | 41.9 |
| $r_7=+0.9444$ | $d_7=0.14722$ | $n_7=1.51454$ | 54.62 |
| $r_8=-0.5992$ | $d_8=0.02778$ | $n_8=1.0$ | |
| $r_9=+1.0775$ | $d_9=0.19444$ | $n_9=1.78470$ | 26.1 |
| $r_{10}=-0.7172$ | $d_{10}=0.00278$ | $n_{10}=1.74443$ | 49.4 |
| $r_{11}=-3.0556$ | $d_{11}=0.08333$ | $n_{11}=1.0$ | |
| $r_{12}=-1.0691$ | $d_{12}=0.00278$ | $n_{12}=1.76684$ | 46.2 |
| $r_{13}=+3.6111$ | $d_{13}=0.06944$ | $n_{13}=1.0$ | |
| $r_{14}=-2.1958$ | | $n_{14}=1.74400$ | 44.9 |
| | | $n_{15}=1.0$ | | where $r_1, r_2, \ldots r_{14}$ are the radii of curvature of the surfaces, $d_1, d_2 \ldots d_{13}$ are the axial thickness and air spacings of the lenses, $n_1, n_2, \ldots n_{15}$ are the refractive indices, and $vd$ is Abbe's number.

References Cited

UNITED STATES PATENTS 1,955,590  4/1934  Lee ---------------- 350—215

FOREIGN PATENTS 962,368  7/1964  Great Britain.

JOHN K. CORMIN, Primary Examiner

U.S. Cl. X.R.

350—215